US012532955B1

(12) United States Patent
Zhong

(10) Patent No.: US 12,532,955 B1
(45) Date of Patent: Jan. 27, 2026

(54) OUTDOOR SPORTS BACKPACK

(71) Applicant: SHENZHEN ANDELIAN TECHNOLOGY CO., LTD., Guangdong (CN)

(72) Inventor: Shaohua Zhong, Guangdong (CN)

(73) Assignee: SHENZHEN ANDELIAN TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/290,581

(22) Filed: Aug. 5, 2025

(30) Foreign Application Priority Data

Jun. 3, 2025 (CN) ........................ 202521123520.1

(51) Int. Cl.
*A45F 3/04* (2006.01)
*A45F 3/16* (2006.01)
*B05B 9/08* (2006.01)
*A45F 3/00* (2006.01)

(52) U.S. Cl.
CPC ................ *A45F 3/166* (2025.01); *A45F 3/04* (2013.01); *B05B 9/08* (2013.01); *A45F 2003/003* (2013.01); *A45F 2003/045* (2013.01)

(58) Field of Classification Search
CPC .................................. A45F 3/166; B05B 9/08
USPC ....................................... 224/148.2; 222/175
See application file for complete search history.

(56) References Cited

U.S. PATENT DOCUMENTS

| | | | | |
|---|---|---|---|---|
| 6,024,264 A * | 2/2000 | Java | A45B 23/00 224/186 |
| 7,243,860 B2 * | 7/2007 | Junkel | B05B 9/085 239/311 |
| 9,488,164 B2 * | 11/2016 | Osborn | B05B 17/08 |
| 10,470,554 B2 * | 11/2019 | Kovac | B65D 81/18 |
| 10,603,680 B2 * | 3/2020 | Laikind | B05B 12/12 |
| 10,799,660 B2 * | 10/2020 | Klurfeld | A61M 11/00 |
| 10,850,299 B2 * | 12/2020 | DiStefano | B05B 1/18 |
| 11,427,460 B2 * | 8/2022 | Steele | B67D 1/1243 |
| 12,392,511 B1 * | 8/2025 | Sands | B05B 9/0822 |

(Continued)

FOREIGN PATENT DOCUMENTS

| | | |
|---|---|---|
| CN | 202680965 U * | 1/2013 |
| CN | 211887625 U * | 11/2020 |

(Continued)

*Primary Examiner* — Justin M Larson
(74) *Attorney, Agent, or Firm* — HOWARD M COHN and Associates, LLC

(57) ABSTRACT

An outdoor sports backpack includes a backpack body, a liquid storage assembly, a spray pipeline, an atomization module, and a drinking pipeline. The backpack body has a storage cavity, a first pipeline outlet and a second pipeline outlet communicated with the storage cavity. The liquid storage assembly is arranged in the storage cavity and having a liquid outlet. The spray pipeline is communicated with the liquid outlet and configured to pass through the first pipeline outlet to partially extend out of the storage cavity of the backpack body. The atomization module is arranged in the storage cavity and connected in the spray pipeline and configured to atomize the liquid stored in the liquid storage assembly into mist. The drinking pipeline is communicated with the liquid outlet and configured to pass through the second pipeline outlet to partially extend out of the storage cavity of the backpack body.

18 Claims, 9 Drawing Sheets

(56) References Cited

U.S. PATENT DOCUMENTS

| | | | | |
|---|---|---|---|---|
| 2008/0006717 | A1 * | 1/2008 | Junkel | B05B 9/085<br>239/302 |
| 2011/0192785 | A1 * | 8/2011 | Pritchard | C02F 1/002<br>210/419 |
| 2019/0059562 | A1 * | 2/2019 | Escava | A45F 3/20 |
| 2024/0389740 | A1 * | 11/2024 | O'Brien | A45F 3/20 |
| 2025/0120499 | A1 * | 4/2025 | Gauvain | A45F 3/20 |

FOREIGN PATENT DOCUMENTS

| | | | | |
|---|---|---|---|---|
| DE | 102020127351 | A1 * | 11/2021 | B05B 11/1032 |
| WO | WO-2009019797 | A1 * | 2/2009 | B05B 17/0615 |

* cited by examiner

OUTDOOR SPORTS BACKPACK

CROSS-REFERENCE TO RELATED APPLICATIONS

The application claims priority of Chinese patent application CN2025211235201, filed on Jun. 3, 2025, which is incorporated herein by reference in its entireties.

FIELD

The present disclosure relates to outdoor sports equipment, and in particular, to an outdoor sports backpack.

BACKGROUND

An outdoor sports backpack is a backpack specifically designed for outdoor activities. In relevant existing technologies, outdoor sports backpacks merely offer storage functionality for items such as water bottles, chargers, keychains, and the like. When a user needs to drink water, it is needed to take the water bottle filled with liquid out of the outdoor sports backpack, and after finishing drinking, it is needed to put the water bottle back into the backpack again. It is cumbersome in operation, simple in functionality, and not convenient for users.

SUMMARY

An embodiment of the present disclosure provides an outdoor sports backpack, which can solve the problem of cumbersome in operation, simple in functionality, and not convenient for users in related prior art.

The present disclosure discloses an outdoor sports backpack, the outdoor sports backpack includes a backpack body, a liquid storage assembly, a spray pipeline, an atomization module and a drinking pipeline. The backpack body having a storage cavity, a first pipeline outlet communicated with the storage cavity and a second pipeline outlet communicated with the storage cavity. The liquid storage assembly, arranged in the storage cavity and having a liquid outlet. The spray pipeline, communicated with the liquid outlet and configured to pass through the first pipeline outlet to partially extend out of the storage cavity of the backpack body. The atomization module, arranged in the storage cavity and connected in the spray pipeline and configured to atomize the liquid stored in the liquid storage assembly into mist. The drinking pipeline, communicated with the liquid outlet and configured to pass through the second pipeline outlet to partially extend out of the storage cavity of the backpack body.

Based on the outdoor sports backpack in the embodiment of the present disclosure, by configuring the liquid storage assembly and the drinking pipeline, with the drinking pipeline communicated with the liquid outlet of the liquid storage assembly and extending partially outside the backpack body through the second pipeline outlet, users can easily perform drinking operations using the exposed drinking pipeline when needed. Compared to outdoor sports backpacks in relevant technologies, users do not need to repeatedly take out the liquid storage assembly from the backpack body and place the liquid storage assembly into the backpack body. Instead, they can simply perform drinking operations using the exposed drinking pipeline, which is simple to operate and offers diverse functions, enhancing user convenience. By configuring the liquid storage assembly, the spray pipeline, and the atomization module, with the spray pipeline communicated with the liquid outlet of the liquid storage assembly, the atomization module installed on the spray pipeline, and the spray pipeline extending partially outside the backpack body through the first pipeline outlet, users can easily perform spray cooling operations directly using the exposed spray pipeline when needed. Moreover, by configuring two distinct water pathways—the atomization pipeline and the drinking pipeline—the outdoor sports backpack in the present disclosure not only has a simple storage function but also enables spray cooling and drinking functions, offering diverse capabilities and enhancing user convenience.

BRIEF DESCRIPTION OF THE DRAWINGS

In order to explain the technical solutions of the embodiments of the present disclosure or the prior art more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION

Figure 1:
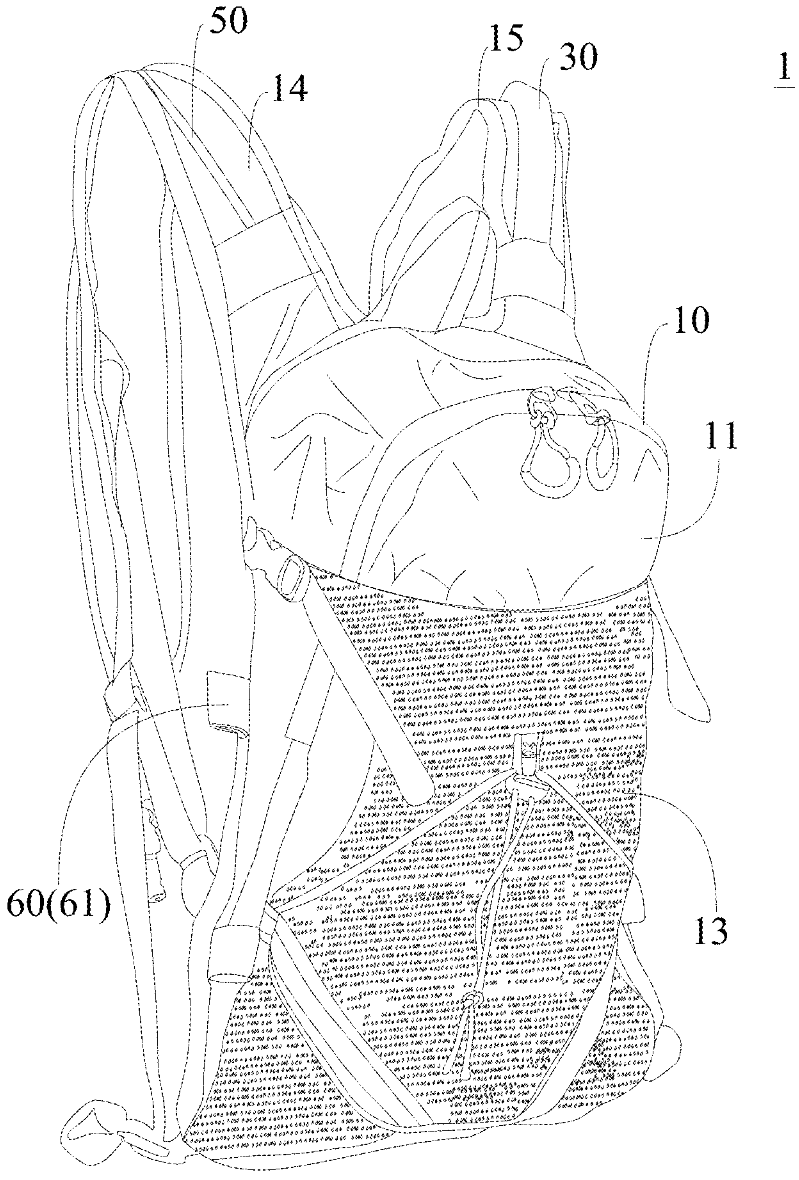
FIG. 1 is a schematic diagram of an outdoor sports backpack according to an embodiment of the present disclosure.

In order to make the aims, technical solution and advantages of the present invention will be clearly, the present invention is further described below in combination with accompanying drawings and implementations. It should be understood that the specific embodiments described herein are intended only to explain the present invention and are not intended to define the present invention.

Referring to FIGS. 1-4, an outdoor sports backpack 1 by an embodiment of the present disclosure not only has a simple storage function but also enables spray cooling and drinking functions, offering diverse capabilities and enhancing user convenience.

The outdoor sports backpack 1 includes a backpack body 10, a liquid storage assembly 20, a spray pipeline 30, an atomization module 40, and a drinking pipeline 50. The backpack body 10 includes a storage cavity 10*a*, a first pipeline outlet 10*d* communicated with the storage cavity 10*a*, and a second pipeline outlet 10*e* communicated with the storage cavity 10*a*. The liquid storage assembly 20 is arranged within the storage cavity 10*a* and includes a liquid outlet 20*a*. The spray pipeline 30 is communicated with the liquid outlet 20*a* and extends partially outside the storage cavity 10*a* of the backpack body 10 through the first pipeline outlet 10*d*. The atomization module 40 is positioned inside the storage cavity 10*a* and is connected to the spray pipeline 30 and is configured to atomize the liquid stored in the liquid storage assembly 20 into mist. The drinking pipeline 50 is communicated with the liquid outlet 20*a* and extends partially outside the storage cavity 10*a* of the backpack body 10 through the second pipeline outlet 10*e*.

A detailed structure of the outdoor sports backpack 1 will be elaborated below in conjunction with FIGS. 1-10.

As illustrated in FIGS. 1-4, the outdoor sports backpack 1 includes the backpack body 10, the liquid storage assembly 20, the spray pipeline 30, the atomization module 40, and the drinking pipeline 50.

The backpack body 10 serves as a wearable main body of the outdoor sports backpack 1. The material of the backpack body 10 is not limited here, and an ordinary person skilled in the art can make reasonable choices based on actual needs. For example, the material of the backpack body 10 may include, but not limited to, nylon, polyester, canvas, or waterproof fabrics. The specific structure of the backpack body 10 will be introduced in detail below.

The backpack body 10 includes the storage cavity 10*a*, the first pipeline outlet 10*d*, and the second pipeline outlet 10*e*. The storage cavity 10*a* is a space within the backpack body 10 that can be used for storing components such as, but not limited to, the liquid storage assembly 20, the atomization module 40, keychains, and chargers. The first pipeline outlet 10*d*, as one of the pipeline openings of the backpack body 10, communicates with the storage cavity 10*a* to allow the spray pipeline 30 to extend outside the storage cavity 10*a*. The second pipeline outlet 10*e*, as another pipeline opening of the backpack body 10, also communicates with the storage cavity 10*a* to allow the drinking pipeline 50 to extend outside the storage cavity 10*a*.

The liquid storage assembly 20 serves as a liquid storage container for the outdoor sports backpack 1. The material of the liquid storage assembly 20 is not limited here, and the ordinary person skilled in the art can make reasonable choices based on actual needs. For example, the material of the liquid storage assembly 20 may include, but not limited to, food-grade plastics, food-grade rubber, or food-grade silicone. The specific structure of the liquid storage assembly 20 will be introduced in detail below.

The liquid storage assembly 20 can be placed inside the storage cavity 10*a* of the backpack body 10. It should be noted that when the liquid storage assembly 20 is placed inside the storage cavity 10*a* of the backpack body 10, it can be fixedly connected to the backpack body 10 or not. When a fixed connection between the liquid storage assembly 20 and the backpack body 10, the liquid storage assembly 20 can be detachably connected to the backpack body 10 through methods such as, but not limited to, snap-fitting or strap binding.

The liquid storage assembly 20 includes the liquid outlet 20*a*, which is an opening on the liquid storage assembly 20 configured to allow liquid to flow out of the liquid storage assembly 20 (specifically, the liquid storage assembly 20 can be the liquid storage bag 21 introduced below).

The spray pipeline 30 serves as one of the water supply pipelines of the outdoor sports backpack 1. The material of the spray pipeline 30 is not limited here, and the ordinary person skilled in the art can make reasonable choices based on actual needs. For example, the material of the spray pipeline 30 may include, but not limited to, food-grade plastics, food-grade rubber, or food-grade silicone. The specific structure of the spray pipeline 30 will be introduced in detail below.

The spray pipeline 30 is communicated with the liquid outlet 20*a* of the liquid storage assembly 20 and extends outside the storage cavity 10*a* of the backpack body 10 through the first pipeline outlet 10*d* of the backpack body 10. This arrangement facilitates users in performing spray cooling operations directly using the exposed spray pipeline 30 when needed.

As shown in FIGS. 1-4, the atomization module 40 serves as a functional module of the outdoor sports backpack 1, configured to atomize the liquid stored in the liquid storage assembly 20 (specifically, the liquid storage bag 21 introduced below) into a fine mist for users to spray for cooling purposes. The specific structure of the atomization module 40 will be elaborated on below.

The atomization module 40 can be placed inside the storage cavity 10*a* of the backpack body 10. It should be noted that when the atomization module 40 is placed inside the storage cavity 10*a* of the backpack body 10, there may or may not be a fixed connection between the atomization module 40 and the backpack body 10. When a fixed connection exists, the backpack body 10 can be detachably connected to the atomization module 40 through methods such as, but not limited to, snap-fitting or strap binding.

The atomization module 40 is connected to the spray pipeline 30, allowing the liquid flowing through the spray pipeline 30 to be atomized into fine droplets by the atomization module 40 for users to spray for cooling.

The drinking pipeline 50 serves as another water supply pipeline of the outdoor sports backpack 1. The material of the drinking pipeline 50 is not limited here, and the ordinary person skilled in the art can make reasonable choices based on actual needs. For example, the material of the drinking pipeline 50 may include, but not limited to, food-grade plastics, food-grade rubber, or food-grade silicone.

The drinking pipeline 50 is communicated with the liquid outlet 20*a* of the liquid storage assembly 20 and extends partially outside the storage cavity 10*a* of the backpack body 10 through the second pipeline outlet 10*e* of the backpack body 10. This arrangement facilitates users in performing drinking operations directly using the exposed drinking pipeline 50 when needed.

Based on the outdoor sports backpack 1 in the embodiment of the present disclosure, by configuring the liquid storage assembly 20 and the drinking pipeline 50, with the drinking pipeline 50 communicated with the liquid outlet 20*a* of the liquid storage assembly 20 and extending partially outside the backpack body 10 through the second pipeline outlet 10*e*, users can easily perform drinking operations using the exposed drinking pipeline 50 when needed. Compared to outdoor sports backpacks 1 in relevant technologies, users do not need to repeatedly take out the liquid storage assembly 20 from the backpack body 10 and place the liquid storage assembly 20 into the backpack body 10. Instead, they can simply perform drinking operations using the exposed drinking pipeline 50, which is simple to operate and offers diverse functions, enhancing user convenience.

By configuring the liquid storage assembly 20, the spray pipeline 30, and the atomization module 40, with the spray pipeline 30 communicated with the liquid outlet 20*a* of the liquid storage assembly 20, the atomization module 40 installed on the spray pipeline 30, and the spray pipeline 30 extending partially outside the backpack body 10 through the first pipeline outlet 10*d*, users can easily perform spray cooling operations directly using the exposed spray pipeline 30 when needed. Moreover, by configuring two distinct water pathways—the atomization pipeline 40 and the drinking pipeline 50—the outdoor sports backpack 1 in the present disclosure not only has a simple storage function but also enables spray cooling and drinking functions, offering diverse capabilities and enhancing user convenience.

Figure 4:
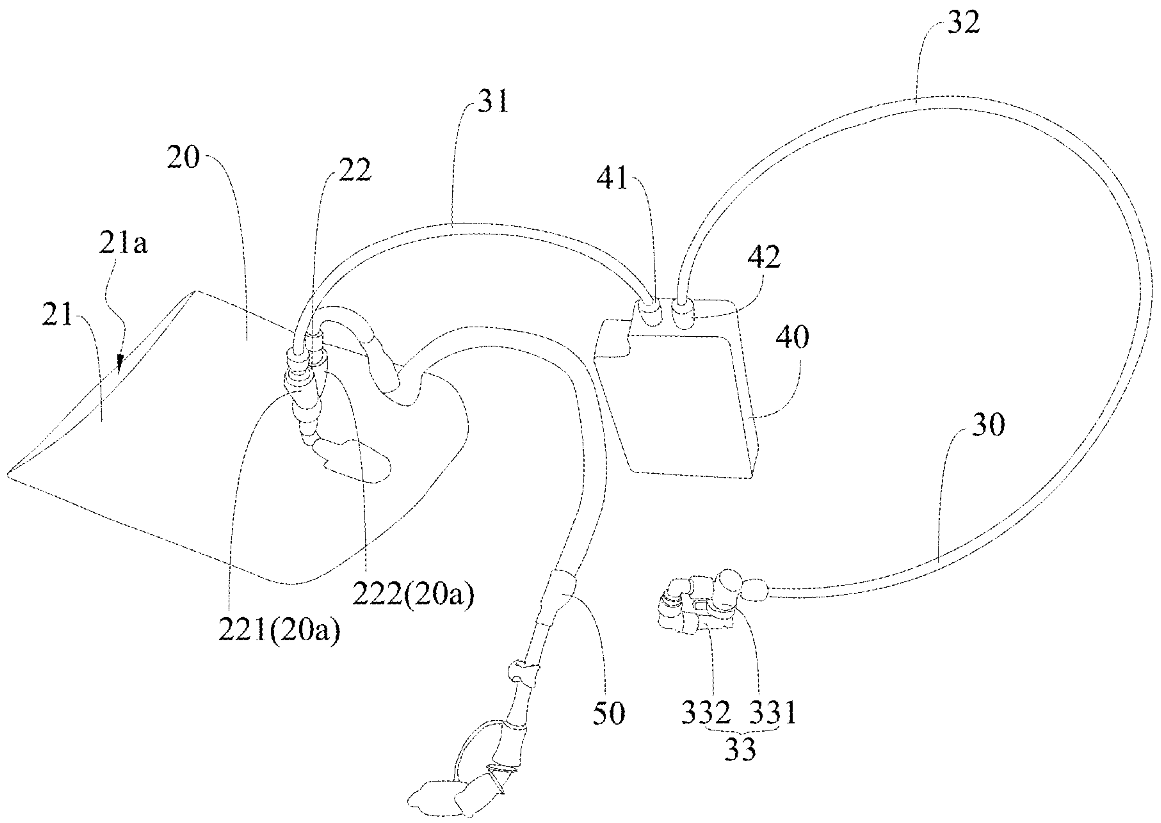
FIG. 4 is a schematic diagram of the liquid storage assembly and the atomization module according to an embodiment of the present disclosure.

As shown in FIG. 4, the liquid storage assembly 20 includes a liquid storage bag 21 and a three-way valve 22. The liquid storage bag 21 is configured to store liquid. An inlet channel of the three-way valve 22 is communicated with an interface at a bottom end of the liquid storage bag 21, a first outlet channel 221 of the three-way valve 22 serves as the liquid outlet 20*a* and is communicated with the spray pipeline 30, and a second outlet channel 222 of the three-way valve 22 serves as the liquid outlet 20*a* and is communicated with the drinking pipeline 50. By configuring the liquid storage bag 21 to store liquid, it meets users' needs for spray cooling and drinking; by configuring the three-way valve 22, with its first outlet channel 221 communicated with the spray pipeline 30 and its second outlet channel 222 communicated with the drinking pipeline 50, achieving two pipelines to share one interface at the bottom end of the liquid storage bag 21, which is simple in structure and easy to implementation.

Figure 5:
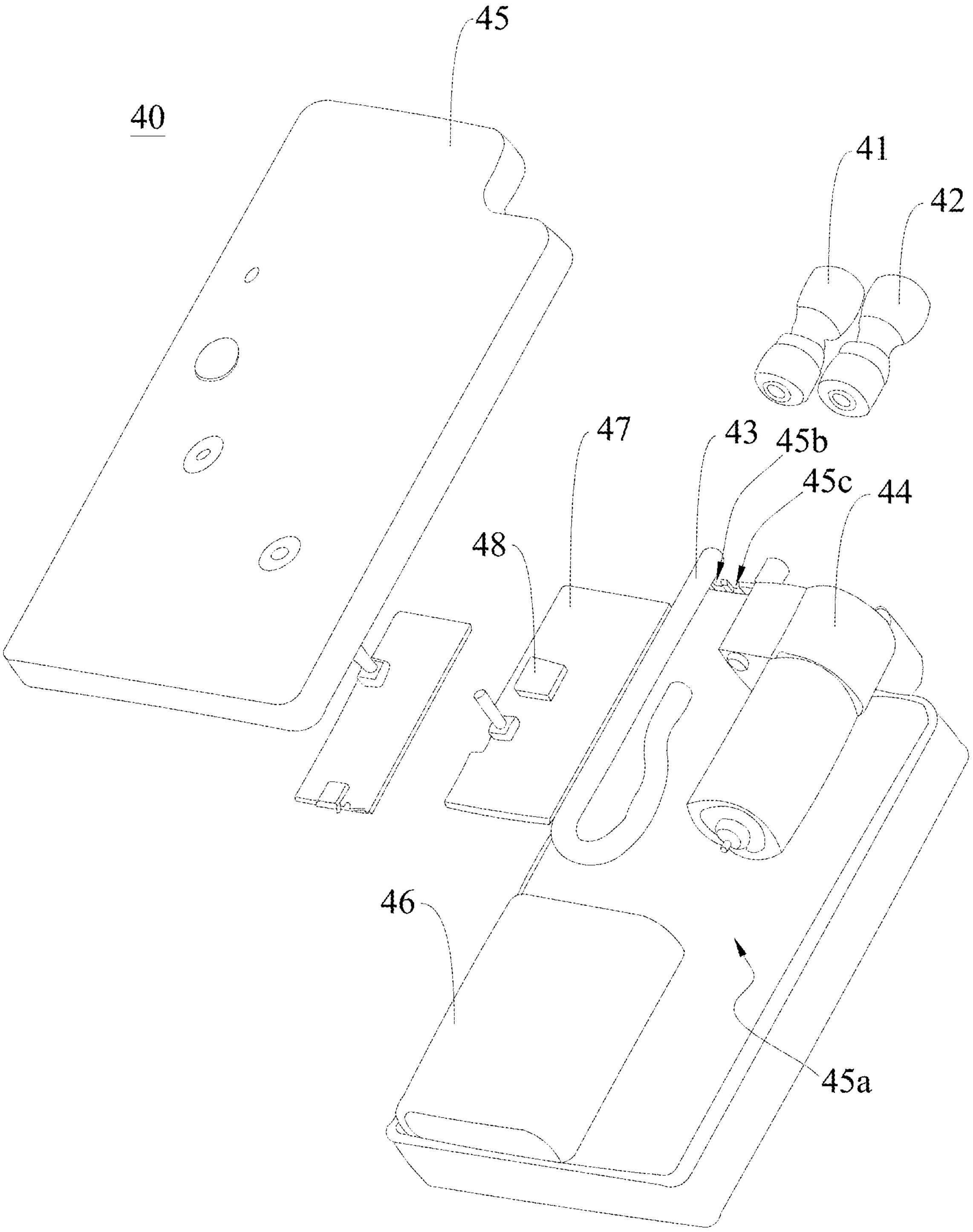
FIG. 5 is an exploded view of the atomization module according to an embodiment of the present disclosure.

As shown in FIGS. 4-5, the spray pipeline 30 includes a first pipe section 31 and a second pipe section 32. A first end of the first pipe section 31 is communicated with the first outlet channel 221 of the three-way valve 22. The atomization module 40 includes a liquid inlet connector 41, a liquid outlet connector 42, a connecting pipeline 43, and an atomizer 44. A liquid inlet end of the liquid inlet connector 41 is communicated with a second end of the first pipe section 31. A liquid outlet end of the liquid outlet connector 42 is communicated with a first end of the second pipe section 32; a first end of the connecting pipeline 43 is communicated with a liquid outlet end of the liquid inlet connector 41, and a second end of the connecting pipeline 43 is connected to a liquid inlet end of the liquid outlet connector 42. An atomizing end of the atomizer 44 is communicated with the connecting pipeline 43, and the atomizer 44 is closer to the liquid outlet connector 42 than the liquid inlet connector 41, The atomizer 44 is configured to atomize the liquid stored in the liquid storage bag 21 into a fine mist.

A second end of the second pipe section 32 is communicated with a spray nozzle, which has an open state and a closed state. Users can switch the spray nozzle from the closed state to the open state or vice versa by rotating a knob on the spray nozzle.

When users need to perform a spray cooling operation, they rotate the knob on the spray nozzle to switch it from the closed state to the open state. At this point, the liquid in the liquid storage bag 21 flows out from the interface at the bottom end of the liquid storage bag 21 under a suction force of the atomizer 44. The liquid then passes through the first pipe section 31, the atomizer 44, and the second pipe section 32, where it is atomized into a fine mist by the atomizer 44 and sprayed out from the spray nozzle, thus achieving the purpose of spray cooling. It should be noted that, in addition to cooling function, the spray pipeline 30 can further be used for recreational activities such as water fights.

As shown in FIGS. 4-5, the atomization module 40 further includes a housing 45, a battery 46, and a main control board 47. The housing 45 has an installation cavity 45*a*, a first opening 45*b* and a second opening 45*c* communicated with the installation cavity 45*a*. The battery 46 is arranged inside the installation cavity 45*a* and connected to the housing 45. The main control board 47 is arranged inside the installation cavity 45*a* and connected to the housing 45, The main control board 47 is electrically connected to the battery 46 and the atomizer 44. The connecting pipeline 43 is located inside the installation cavity 45*a*. The atomizer 44 is located inside the installation cavity 45*a* and connected to the housing 45. The liquid inlet connector 41 is connected to the housing 45 corresponding to the first opening 45*b*; the liquid outlet connector 42 is connected to the housing 45 corresponding to the second opening 45*c*.

The housing 45 serves as an outer shell of the atomization module 40, integrating components such as the liquid inlet connector 41, the liquid outlet connector 42, the connecting pipeline 43, the atomizer 44, the battery 46, and the main control board 47. The material of the housing 45 is not limited here, and the ordinary person skilled in the art can make reasonable choices based on actual needs. For example, the material of the housing 45 may include, but not limited to, plastic. The shape of the housing 45 is not limited here, and the ordinary person skilled in the art can make reasonable designs based on actual needs; for example, the shape of the housing 45 may include, but not limited to, a rectangular-like shape.

The battery 46 serves as an energy storage unit of the atomization module 40 and configured to supply power to the atomizer 44. The model of the battery 46 is not limited here, and the ordinary person skilled in the art can make reasonable choices based on actual needs. The battery 46 is a rechargeable storage battery 46, and the housing 45 is equipped with a charging port (such as a USB port). When the battery 46 is low on power, users can connect the charging port to an external power source using a charging cable to charge the battery 46. A connection method between the battery 46 and the housing 45 is not limited here, and the ordinary person skilled in the art can make reasonable designs based on actual needs. For example, the battery 46 can be detachably connected to the housing 45 through at least one of methods including screw connection, snap-fitting, or plugging. Alternatively, the battery 46 can be non-detachably connected to the housing 45 through methods such as, but not limited to, adhesive bonding.

The main control board 47 serves as a main control unit of the atomization module 40. A connection method between the main control board 47 and the housing 45 is not limited here, and the ordinary person skilled in the art can make reasonable designs based on actual needs. For example, the main control board 47 can be detachably connected to the housing 45 through at least one of methods such as screw connection, snap-fitting, or plugging. Alternatively, the main control board 47 can be non-detachably connected to the housing 45 through methods such as, but not limited to, adhesive bonding. A controller 48 integrated on the main control board 47 is electrically connected to the atomizer 44.

The first opening 45*b* and the second opening 45*c* are located on the same side of the housing 45, facilitating arrangement of the connecting pipeline 43 inside the housing 45. This arrangement enables a more compact arrangement of the connecting pipeline 43, the battery 46, the main control board 47, and the atomizer 44 within the housing 45, contributing to a reduction in an overall size of the atomization module 40.

A connection method between the liquid inlet connector 41 (liquid outlet connector 42) and the housing 45 is not limited here, and the ordinary person skilled in the art can make reasonable designs based on actual needs. For example, the liquid inlet connector 41 (liquid outlet connector 42) can be detachably connected to the housing 45 through at least one of methods such as screw connection, snap-fitting, or plugging. Alternatively, the liquid inlet connector 41 (liquid outlet connector 42) can be non-detachably connected to the housing 45 through methods such as, but not limited to, adhesive bonding.

By configuring the housing 45, it integrates components including the liquid inlet connector 41, the liquid outlet connector 42, the connecting pipeline 43, the atomizer 44, battery 46, and the main control board 47 into a single unit, achieving a modular design that facilitates portability. By configuring the battery 46 and main control board 47, the battery 46 supplies power to the atomizer 44 through the main control board 47 to meet the normal atomization function of the atomizer 44.

Figure 6:
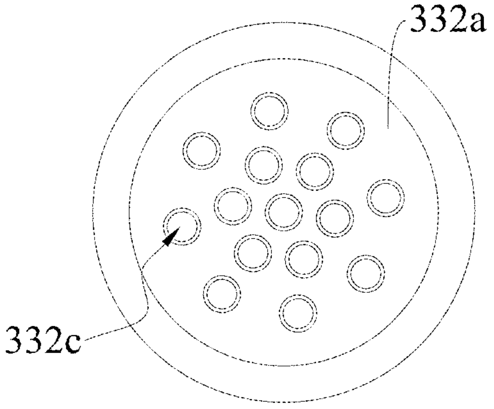
FIG. 6 is a front view of a first nozzle tip according to an embodiment of the present disclosure.
Figure 7:
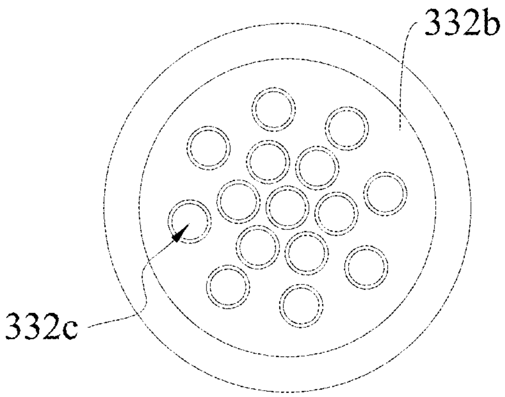
FIG. 7 is a front view of a second nozzle tip according to an embodiment of the present disclosure.

As shown in FIGS. 4, 6, and 7, the spray nozzle 33 can switch between the open state and the closed state. The spray nozzle 33 includes a nozzle body 331 and a plurality of nozzle tips 332. The nozzle body 331 is connected to the second end of the second pipe section 32, and the nozzle body 331 is detachably connected to any one of the nozzle tips 332. The nozzle tips 332 have orifices 332*c* in different diameters respectively. The nozzle tip 332 can be detachably connected to the nozzle body 331 through methods such as, but not limited to, screw connection or snap-fitting. A sealing structure, such as a sealing ring, is provided at the joint between the nozzle tip 332 and the nozzle body 331 to achieve effective sealing. In the embodiment of the present disclosure, the spray nozzle 33 is equipped with at least two nozzle tips 332 in different sizes. For example, the nozzle tips 332 include a first nozzle tip 332*a* and a second nozzle tip 332*b*, with a diameter of the orifice 332*c* of the first nozzle tip 332*a* being 0.15 millimeters, and/or a diameter of the orifice 332*c* of the second nozzle tip 332*b* being 0.2 millimeters. By default, the nozzle body 331 is connected to the first nozzle tip 332*a* with an orifice 332*c* diameter of 0.15 millimeters, while the second nozzle tip 332*b* with an orifice 332*c* diameter of 0.2 millimeters serves as a spare for users to replace the first nozzle tip 332*a* according to actual needs.

Figure 3:
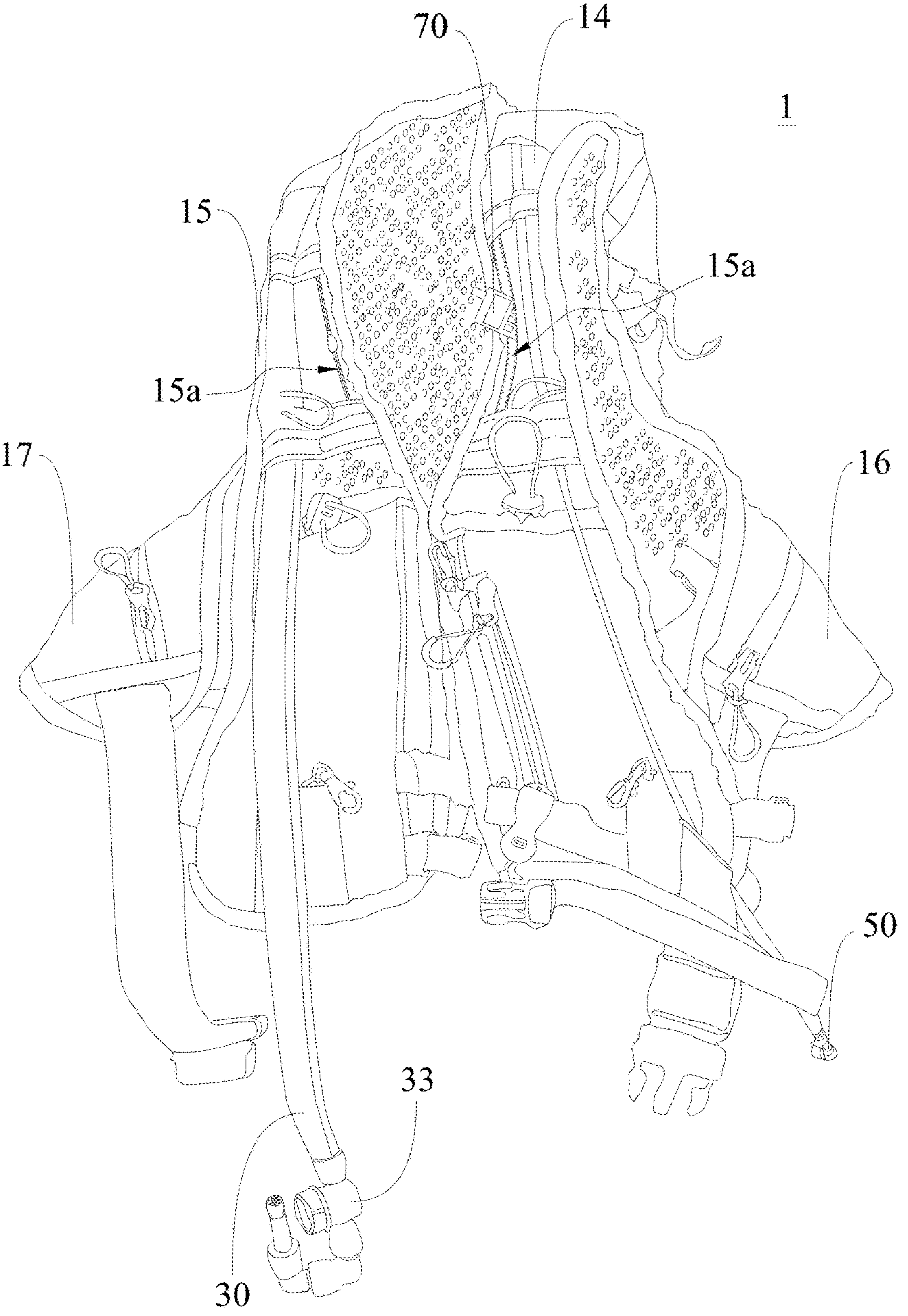
FIG. 3 is a schematic diagram of the outdoor sports backpack from another perspective according to an embodiment of the present disclosure.

As shown in FIG. 3, the outdoor sports backpack 1 further includes a remote control 70 with gear adjustment functionality. Users can manipulate the remote control 70 to different gears according to actual needs to change the atomization amount of the spray nozzle 33. The remote control 70 is configured to be set to different gears and generate corresponding control signals under user operations. The remote control 70 sends control signals to the main control board 47, and the controller 48 integrated on the main control board 47 adjusts the parameters of the atomizer 44 based on the control signals to change the atomization amount of the spray nozzle 33. The controller 48 integrated on the main control board 47 can change the atomization amount of the spray nozzle 33 by adjusting parameters of the atomizer 44 such as a ultrasonic frequency or a liquid flow rate, etc. The remote control 70 sends control signals to the main control board 47 via wireless communication. For example, a Bluetooth chip can be integrated on the main control board 47, and the remote control 70 sends the control signals to the Bluetooth chip integrated on the main control board 47 via Bluetooth communication. The Bluetooth chip integrated on the main control board 47 then sends the control signals to the controller 48 integrated on the main control board 47, enabling the controller 48 to adjust the parameters of the atomizer 44 based on the control signals to change the atomization amount of the spray nozzle 33. Alternatively, an antenna can be integrated on the main control board 47, and the remote control 70 sends the aforementioned control signals to the antenna integrated on the main control board 47 via radio frequency communication. The antenna integrated on the main control board 47 then sends the control signals to the controller 48 integrated on the main control board 47, enabling the controller 48 to adjust the parameters of the atomizer 44 based on the control signals to change the atomization amount of the spray nozzle 33.

It should be noted that in the embodiment of the present disclosure, the remote controller 70 has four gear positions (with each gear position corresponding to controlling the spray nozzle 33 to produce different atomization volumes). When combined with two nozzles 332 of different sizes (namely, the nozzle 332 with an orifice 332*c* diameter of 0.15 millimeters and the nozzle 332 with an orifice 332*c* diameter of 0.2 millimeters as introduced above), eight-gear adjustment can be achieved, effectively enhancing the convenience of using the outdoor sports backpack 1.

Figure 2:
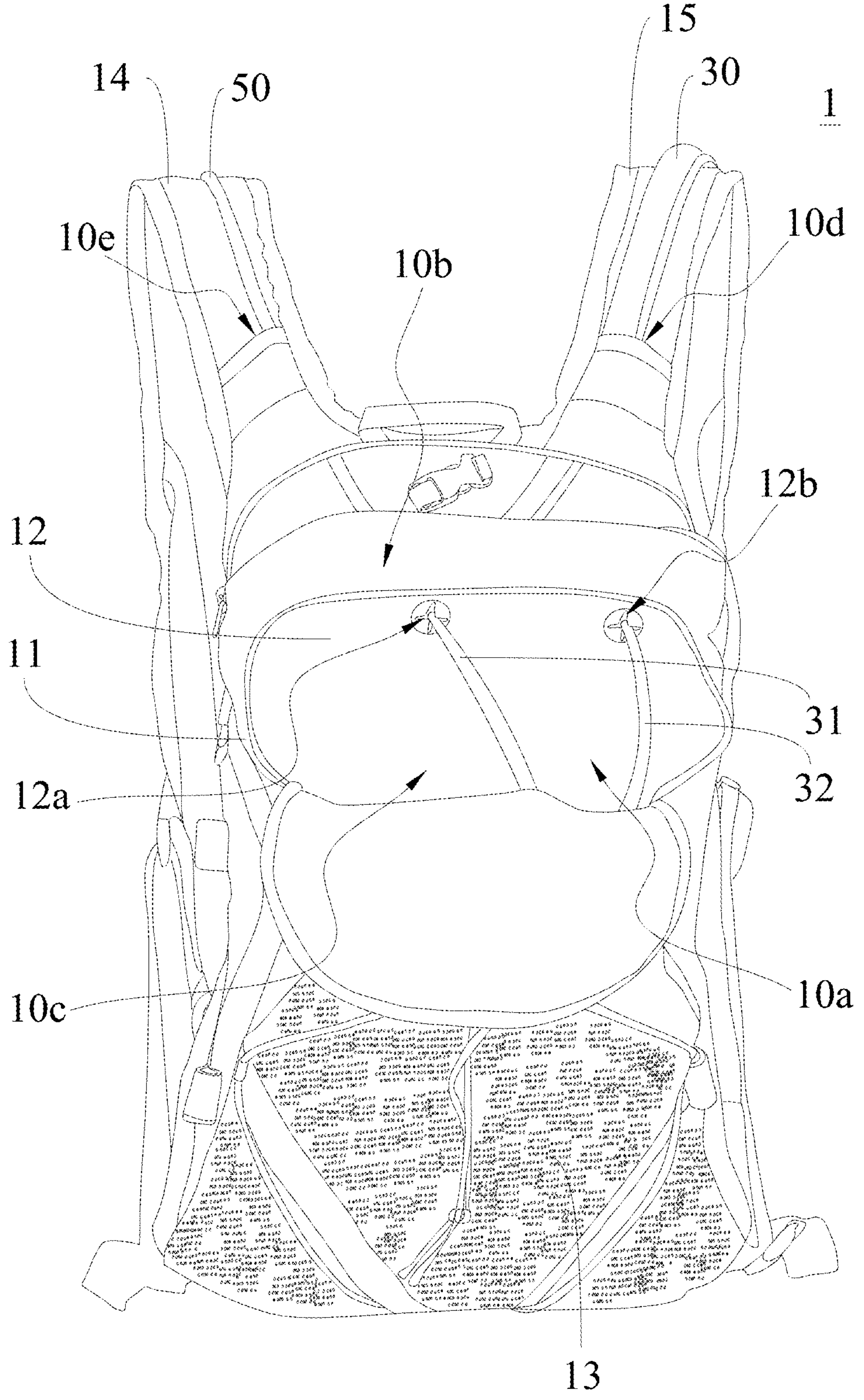
FIG. 2 is a schematic diagram of the outdoor sports backpack with a liquid storage assembly and an atomization module arranged inside a backpack according to an embodiment of the present disclosure.

As shown in FIG. 2, the backpack body 10 includes a bag body 11 and a partition layer 12. The bag body 11 has the storage cavity 10*a*, the first pipeline outlet 10*d*, and the second pipeline outlet 10*e*. The partition layer 12 is arranged inside the storage cavity 10*a* and is connected to the bag body 11 to divide the storage cavity 10*a* into a first sub-cavity 10*b* and a second sub-cavity 10*c*. When the outdoor sports backpack 1 is in a worn state, the first sub-cavity 10*b* is adjacent to the user's back compared to the second sub-cavity 10*c*. The partition layer 12 has a first through-hole 12*a* and a second through-hole 12*b*. The liquid storage assembly 20 is placed inside the first sub-cavity 10*b*, and the atomization module 40 is placed inside the second sub-cavity 10*c*; the second end of the first pipe section 31 passes through the first through-hole 12*a* from a side of the first sub-cavity 10*b* into the second sub-cavity 10*c* and is communicated with the liquid inlet end of the liquid inlet connector 41, and the second end of the second pipe section 32 passes through the second through-hole 12*b* from a side of the second sub-cavity 10*c* into the first sub-cavity 10*b* and passes through the first pipeline outlet 10*d* to partially extend out of the first sub-cavity 10*b*.

The partition layer 12 can be detachably connected to the bag body 11 through methods such as, but not limited to, buckle fastening, or can be non-detachably connected to the bag body 11 through methods such as, but not limited to, thread stitching.

The partition layer 12 is used to divide the storage cavity 10*a* of the bag body 11 into two mutually independent first sub-cavity 10*b* and second sub-cavity 10*c*. By placing the liquid storage assembly 20 in the first sub-cavity 10*b*, which is closer to the user's back, when the outdoor sports backpack 1 is in a worn state, the liquid storage assembly 20 placed in the first sub-cavity 10*b* can be in contact with the user's back, providing a certain cooling effect to the user's back. Moreover, since the liquid storage assembly 20 is entirely made of soft materials, it can enhance comfort of the user when wearing the outdoor sports backpack 1. The partition layer 12 is further configured to divide the storage cavity 10*a* of the bag body 11 into a first sub-cavity 10*b* and a second sub-cavity 10*c* independent from each other. By placing the atomization module 40 in the second sub-cavity

10*c*, which is farther from the user's back, it can effectively prevent the heat generated by the atomization module 40 in operation from dissipating to the user's back, and the liquid stored in the liquid storage assembly 20 can provide a certain cooling effect to the atomization module 40. By configuring the first through-hole 12*a* and the second through-hole 12*b* on the partition layer 12, the first through-hole 12*a* is configured to allow the first pipe section 31 to pass through, enabling the second end of the first pipe section 31 to be communicated with the liquid inlet end of the liquid inlet connector 41, and the second through-hole 12*b* is configured to allow the second pipe section 32 to pass through, enabling the second end of the second pipe section 32 to smoothly pass through the first pipeline outlet 10*d* and extend out of the first sub-cavity 10*b*, allowing the user to perform spray cooling operations using the exposed second pipe section 32. The configuring of the first through-hole 12*a* and the second through-hole 12*b* ensures that the spray pipeline 30 is neatly arranged inside the bag body 11, reducing or even avoiding the possibility of the spray pipeline 30 bending inside the bag body 11, thereby ensuring the normal flow of liquid in the spray pipeline 30.

Figure 8:
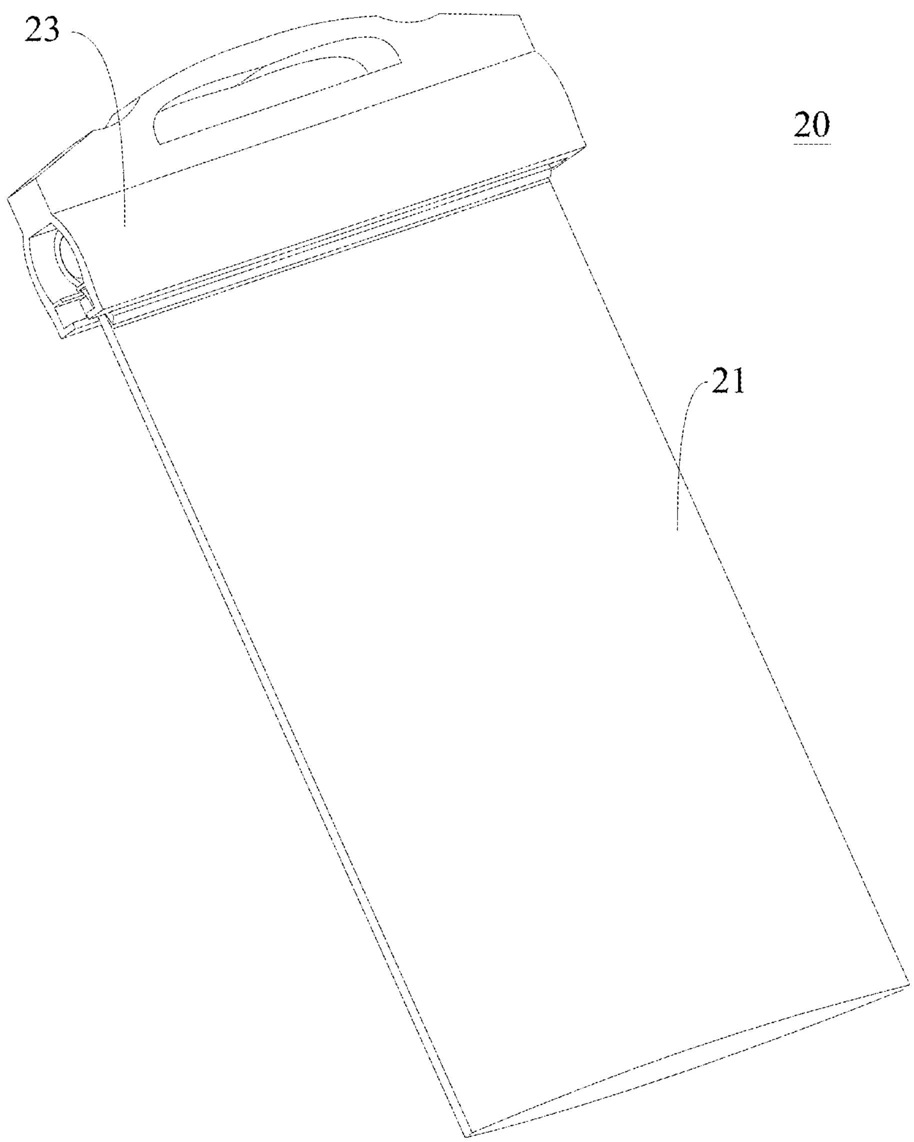
FIG. 8 is a schematic diagram of the liquid storage assembly from a first perspective according to an embodiment of the present disclosure.
Figure 9:
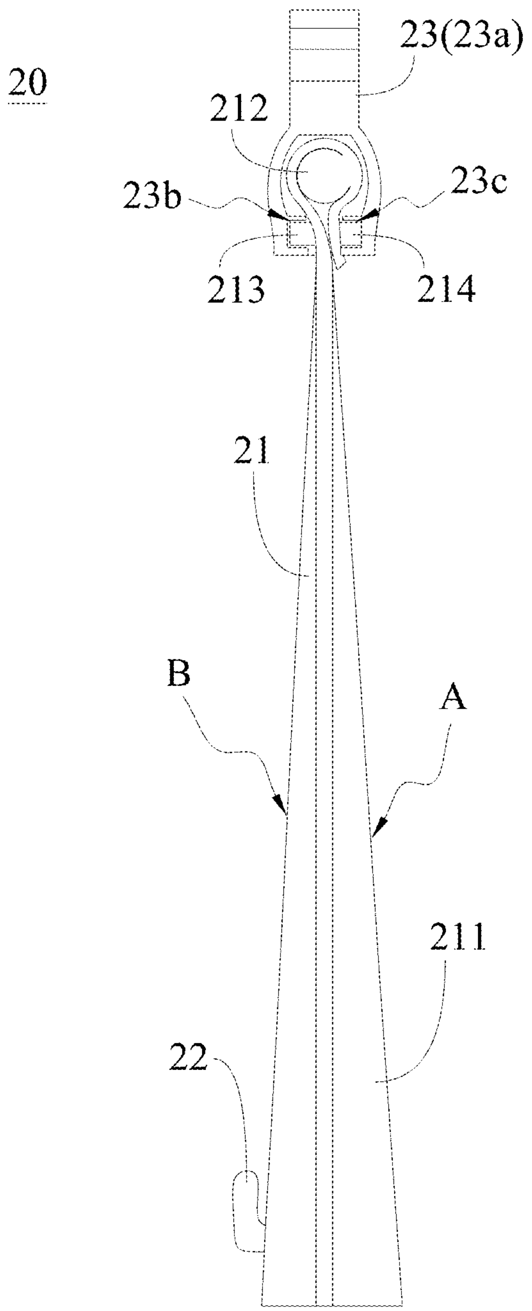
FIG. 9 is a schematic diagram of the liquid storage assembly from a second perspective according to an embodiment of the present disclosure.

As shown in FIGS. 8-9, a top of the liquid storage bag 21 can be opened and closed to form a liquid inlet 21*a*; the liquid storage assembly 20 further includes a sealing member 23, which can be removably connected to the top of the liquid storage bag 21 to seal the liquid inlet 21*a*. The "liquid inlet 21*a*" refers to the opening on the liquid storage bag 21 through which liquid flows into the liquid storage bag 21. By configuring the sealing member 23 to be removably connected to the top of the liquid storage bag 21, when it is necessary to fill the liquid storage bag 21 with liquid, the user needs to remove the sealing member 23 from the top of the liquid storage bag 21 to open the liquid inlet 21*a*, allowing external liquid to be promptly replenished into the liquid storage bag 21. After the liquid storage bag 21 is filled with liquid, the user needs to reinstall the sealing member 23 on the top of the liquid storage bag 21 to seal the liquid inlet 21*a*.

Specifically, the liquid storage bag 21 includes a bag body 211, a squeezing flange 212, a first fixing flange 213, and a second fixing flange 214. The bag body 211 has the liquid outlet 20*a* and the liquid inlet 21*a*; the squeezing flange 212 is located at the top of the bag body 211 and is connected to a first side A of the bag body 211. The first fixing flange 213 and the second fixing flange 214 are located at the top of the bag body 211 and are connected to a second side B of the bag body 211, with the first side A and the second side B being opposite sides of the bag body 211. The sealing member 23 includes a sealing sliding buckle 23*a*, which has a first sliding groove 23*b* and a second sliding groove 23*c* arranged opposite to each other. The liquid storage bag 21 has a sealed state, in which the top of the bag body 211 is folded towards the first side A where the squeezing flange 212 is located, so that the first fixing flange 213 and the second fixing flange 214 are arranged opposite to each other, and the first sliding groove 23*b* engages with the first fixing flange 213, while the second sliding groove 23*c* engages with the second fixing flange 214.

When the liquid storage bag 21 is in the sealed state, the squeezing flange 212 is used to press and close the top of the bag body 211 to seal the liquid inlet 21*a* of the bag body 211 on one hand, and, to cooperate with the first fixing flange 213 and the second fixing flange 214 to fix the sealing sliding buckle 23*a* on the other hand. By configuring the sealing sliding buckle 23*a* with the first sliding groove 23*b* and the second sliding groove 23*c* arranged opposite to each other. When it is necessary to fill the liquid storage bag 21 with liquid, the user needs to slide the sealing sliding buckle 23*a* to have the sealing buckle 23*a* to be detached from the top of the liquid storage bag 21, opening the liquid inlet 21*a* of the liquid storage bag 21 to allow external liquid to be promptly replenished into the liquid storage bag 21. After the liquid storage bag 21 is filled with liquid, the user needs to slide and reinstall the sealing sliding buckle 23*a* on the top of the liquid storage bag 21, so that the first sliding groove 23*b* engages with the first fixing flange 213 and the second sliding groove 23*c* engages with the second fixing flange 214 to seal the liquid inlet 21*a* of the liquid storage bag 21.

More specifically, the detailed designs of the bag body 211, the squeezing flange 212, the first fixing flange 213, and the second fixing flange 214 may include, but not limited to, one or more of the following situations.

In a first situation, the bag body 211, the squeezing flange 212, the first fixing flange 213, and the second fixing flange 214 are integrally formed. The bag body 211, the squeezing flange 212, the first fixing flange 213, and the second fixing flange 214 may be integrally formed through methods such as, but not limited to, injection molding or 3D printing.

In a second situation, the number of the squeezing flange 212 is one and the squeezing flange 212 is in a strip shape extending along a width direction of the bag body 211. By configuring the squeezing flange 212 in the strip shape extending along the width direction of the bag body 211, comprehensive pressing of the top of the bag body 211 can be achieved, effectively improving the sealing performance of the bag body 211.

In a third situation, the number of the first fixing flanges 213 is plural, and a plurality of first fixing flanges 213 are arranged at intervals along the width direction of the bag body 211, and each first fixing flange 213 is in a strip shape extending along the width direction of the bag body 211. This effectively enhances the connection stability between the first sliding groove 23*b* of the sealing sliding buckle 23*a* and the first fixing flanges 213.

In a fourth situation, the number of the second fixing flanges 214 is plural and a plurality of second fixing flanges 214 are arranged at intervals along the width direction of the bag body 211, and each second fixing flange 214 is in a strip shape extending along the width direction of the bag body 211. This effectively enhances the connection stability between the second sliding groove 23*c* of the sealing sliding buckle 23*a* and the second fixing flanges 214.

As shown in FIGS. 1-2, the backpack body 10 further includes a breathable storage layer 13, which is connected to a front side of the bag body 11 to form a storage cavity together with the bag body 11 for placing a helmet. Here, the breathable storage layer 13 can be detachably connected to the bag body 11 through methods such as, but not limited to, buckle fastening, or it can be non-detachably connected to the bag body 11 through methods such as, but not limited to, thread stitching. By configuring the breathable storage layer 13, it forms a storage cavity together with the bag body 11, which can be used to store the helmet for convenience of users.

Specifically, the breathable storage layer 13 includes a mesh fabric connected to the bag body 11. The mesh fabric is connected to the bag body 11 through thread stitching, facilitating storage of the helmet by users.

As shown in FIGS. 1-2, the remote controller 70 is in a communication connection with the atomization module 40 (specifically, the main control board 47 introduced above) to control on and off of the atomization module 40 (specifically, the atomizer 44 mentioned above). When a user needs to use the spray pipeline 30 for spray cooling operations, the user operates the remote controller 70 to turn on the atomization module 40. Then, the user turns the knob on the spray nozzle to switch it from the closed state to the open state. At this time, the liquid in the liquid storage bag 21 flows out from the interface at the bottom end of the liquid storage bag 21 under the suction force of the atomizer 44, and then passes through the first pipe section 31, the atomizer 44, and the second pipe section 32. Under the action of the atomizer 44, the liquid is atomized into water mist and is ejected from the spray nozzle to achieve a spray cooling effect.

Specifically, the backpack body 10 further includes a left shoulder strap 14 and a right shoulder strap 15 connected to the bag body 11. Both the left shoulder strap 14 and the right shoulder strap 15 are provided with pockets 15*a*. There are two remote controllers 70, with one placed in the pocket 15*a* of the left shoulder strap 14 and the other placed in the pocket 15*a* of the right shoulder strap 15. By configuring the pockets 15*a* on both the left shoulder strap 14 and the right shoulder strap 15 and configuring two remote controllers 70 for the atomization module 40, it is convenient for users to retrieve and place the remote controllers 70 in the pockets 15*a* of the left shoulder strap 14 and the right shoulder strap 15 according to actual situations, improving usability convenience.

It should be noted that the left shoulder strap 14 is provided with a fixing member (which can be a fixing ring configured to allow one of the spray pipeline 30 and the drinking pipeline 50 to pass therethrough) configured to fix one of the exposed spray pipeline 30 and the drinking pipeline 50, facilitating positioning of one of the exposed spray pipeline 30 and the drinking pipeline 50 on the left shoulder strap 14. The right shoulder strap 15 is provided with a fixing member (which can be a fixing ring configured to allow one of the spray pipeline 30 and the drinking pipeline 50 to pass therethrough) for fixing the other of the exposed spray pipeline 30 and the drinking pipeline 50, facilitating positioning of the other of the exposed spray pipeline 30 and the drinking pipeline 50 on the right shoulder strap 15.

As shown in FIG. 3, the backpack body 10 further includes a left waist bag 16 and a right waist bag 17 connected to the bag body 11, and one end of the left waist bag 16 away from the bag body 11 is detachably connected to one end of the right waist bag 17 away from the bag body 11. Here, the left waist bag 16 and the right waist bag 17 can be fixedly connected to the bag body 11 through methods such as, but not limited to, thread stitching. The end of the left waist bag 16 away from the bag body 11 and the end of the right waist bag 17 away from the bag body 11 can be detachably connected to each other through methods such as, but not limited to, buckle fastening or hook-and-loop fastening. It should be noted that the left waist bag 16 and the right waist bag 17 not only have storage functions for accommodating items such as keychains but also, when the outdoor sports backpack 1 is in a worn state, enclose the user's waist from the left and right sides and are fixed at their ends to form a loop, providing support and protection for the user's waist.

As shown in FIG. 1, the outdoor sports backpack 1 further includes a hook member 60, which is connected to a middle part of the side of the backpack body 10 and is configured to fasten external components. The external components can include, but not limited to, hiking poles, towels, and sunglasses. By configuring the hook member 60, it is convenient for users to hook external components onto the hook member 60 when needed, freeing users' hands. Specifically, the hook member 60 includes a circular hanging ring 61 stitched onto the middle part of the side of the backpack body 10. The hook member 60 can further include a hook, which is fastened to the middle part of the side end of the backpack body 10 through buckles.

Figure 10:
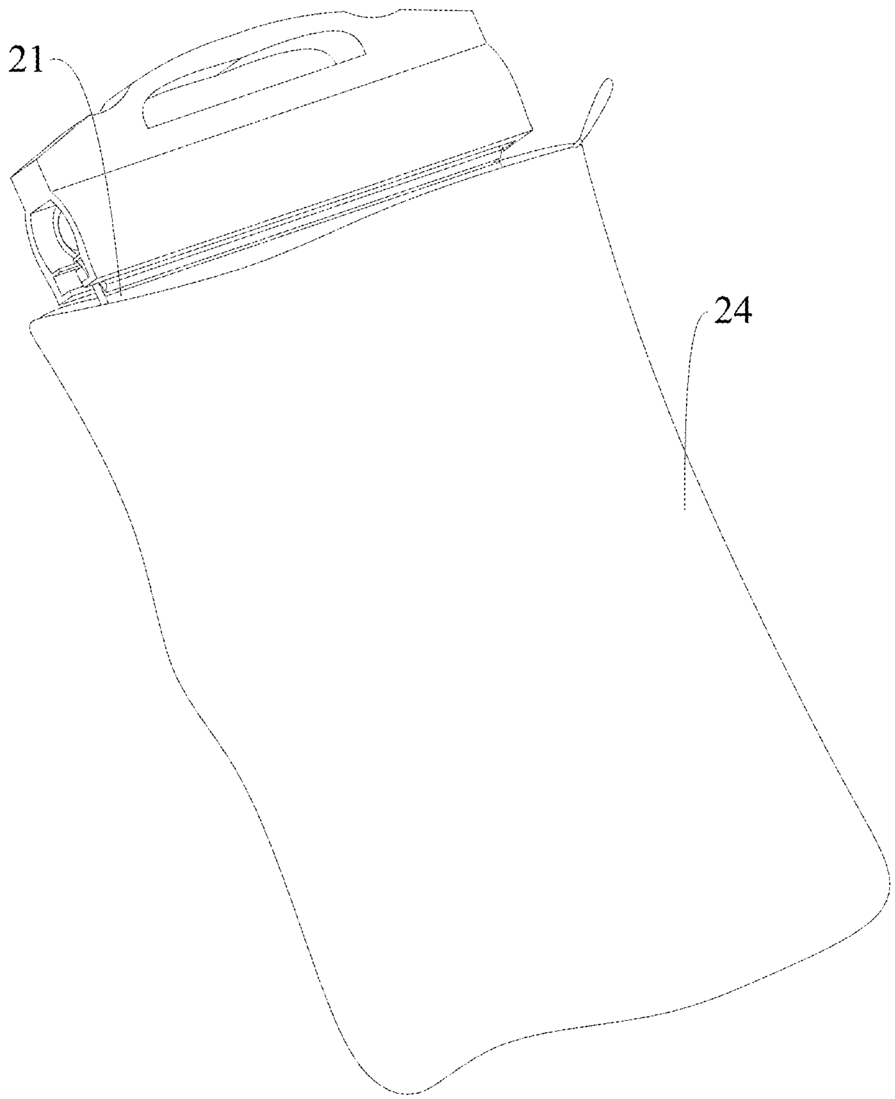
FIG. 10 is a schematic diagram showing an insulation bag covering the liquid storage bag according to an embodiment of the present disclosure.

As shown in FIG. 10, the liquid storage assembly 20 further includes an insulation bag 24, which is sleeved over the liquid storage bag 21. The material of the insulation bag 24 can include, but not limited to, pearl cotton, non-woven fabric, Oxford cloth, or aluminum foil. By configuring the insulation bag 24, which has thermal insulation effects, it can keep the liquid stored in the liquid storage bag 21 cool overnight, especially in summer, allowing users to drink chilled water.

The identical or similar numerals in the accompanying drawings in this embodiment correspond to identical or similar components. In the description of the present disclosure, it should be understood that orientations or positional relationships indicated by the terms "upper", "lower", "left", "right", and the like are orientations or positional relationships as shown in the drawings, and are only for the purpose of facilitating and simplifying the description of the present disclosure instead of indicating or implying that devices or elements indicated must have particular orientations, and be constructed and operated in the particular orientations, so that these terms for describing the positional relationships in the accompanying drawings are only used for exemplary illustrations and are not construed as limiting the present disclosure. A person of ordinary skill in the art can understand the specific meanings of the above terms according to specific situations.

The above are only the preferred embodiments of this application and are not intended to limit this application. Any modifications, equivalent replacements, improvements and the like made within the spirit and principle of this application shall fall within the scope of protection of this application.

What is claimed is:

1. An outdoor sports backpack, comprising a backpack body having a storage cavity, a first pipeline outlet communicated with the storage cavity and a second pipeline outlet communicated with the storage cavity;

a liquid storage assembly, arranged in the storage cavity and having a liquid outlet;

a spray pipeline, communicated with the liquid outlet and configured to pass through the first pipeline outlet to partially extend out of the storage cavity of the backpack body;

an atomization module, arranged in the storage cavity and connected in the spray pipeline and configured to atomize the liquid stored in the liquid storage assembly into mist; and a drinking pipeline, communicated with the liquid outlet and configured to pass through the second pipeline outlet to partially extend out of the storage cavity of the backpack body.

2. The outdoor sports backpack according to claim 1, wherein the backpack body comprises a bag body and a breathable storage layer, the bag body has the storage cavity, the first pipeline outlet, and the second pipeline outlet; the breathable storage layer is connected to a side of the bag body to form a storage cavity together with the bag body and the storage cavity is configured to store a helmet; and the breathable storage layer comprises a mesh fabric connected to the bag body.

3. The outdoor sports backpack according to claim 1, wherein the backpack body comprises a bag body and a left waist bag and a right waist bag, an end of the left waist bag away from the bag body is detachably connected to an end of the right waist bag away from the bag body.

4. The outdoor sports backpack according to claim 1, further comprising a remote control in a communication connection with the atomization module to control on and off of the atomization module; the backpack body comprises a bag body, a left shoulder strap connected to the bag body, and a right should strap connected to the bag body, each of the left shoulder strap and the right shoulder strap with a pocket, the remote control comprises a first remote control configured to be placed in the pocket of the first shoulder strap and a second remote control configured to be placed in the pocket of the second shoulder strap.

5. The outdoor sports backpack according to claim 1, further comprising a hook member connected to a middle part of a side of the backpack body and is configured to fasten external components.

6. The outdoor sports backpack according to claim 5, wherein the hook member comprises a circular hanging ring stitched onto the middle part of the side of the backpack body.

7. The outdoor sports backpack according to claim 1, wherein the liquid storage assembly comprises:

a liquid storage bag, configured to store liquid;

a three-way valve, comprising an inlet channel communicated with an interface at a bottom end of the liquid storage bag, a first outlet channel serving the liquid outlet communicated with the spray pipeline, and a second outlet channel of the three-way valve serving the liquid outlet communicated with the drinking pipeline.

8. The outdoor sports backpack according to claim 7, wherein the liquid storage assembly further comprises an insulation bag configured to sleeve on the liquid storage bag.

9. The outdoor sports backpack according to claim 7, wherein a top of the liquid storage bag is configured to be opened and closed to form a liquid inlet, the liquid storage assembly comprises a sealing member configured to be detachably connected to the top of the liquid storage bag to seal the liquid inlet; and the liquid storage bag comprises a bag body, at least one squeezing flange, at least one first fixing flange, and at least one second fixing flange, the bag body comprises the liquid outlet and the liquid inlet; the at least one squeezing flange is arranged at the top of the bag body and is connected to a first side of the bag body, the at least one first fixing flange and the at least one second fixing flange are arranged at the top of the bag body and are connected to a second end of the bag body, the first side and the second side are two opposite sides of the bag body; the sealing member comprises a sealing sliding buckle having a first sliding groove and a second sliding groove; the liquid storage bag has a sealed state in which the top of the bag body is folded towards the first side where the at least one squeezing flange is positioned to have the at least one first fixing flange and the at least one second fixing flange opposite to each other, the first sliding groove is engaged with the at least one first fixing flange, and the second sliding groove is engaged with the at least one second fixing flange.

10. The outdoor sports backpack according to claim 9, wherein bag body, the squeezing flange, the first fixing flange, and the second fixing flange are integrally formed.

11. The outdoor sports backpack according to claim 9, wherein the number of the at least one squeezing flange is one and the squeezing flange is strip-shaped and extends along a width direction of the bag body; and/or the number of the at least one first fixing flange is multiple and multiple first fixing flanges are arranged at interval along the width direction of the bag body, and each first fixing flange is in a strip shape extending along the width direction of the bag body; and/or the number of the at least one second fixing flange is multiple and multiple second fixing flanges are arranged at interval along the width direction of the bag body, and each second fixing flange is in a strip shape extending along the width direction of the bag body.

12. The outdoor sports backpack according to claim 7, wherein the spray pipeline comprises a first pipe section and a second pipe section, wherein a first end of the first pipe section is communicated with the first outlet channel of the three-way valve; the atomization module comprises:

a liquid inlet connector, comprising a liquid inlet end communicated with a second end of the first pipe section;

a liquid outlet connector, comprising a liquid outlet end communicated with a first end of the second pipe section;

a connecting pipeline, comprising a first end communicated with a liquid outlet of the liquid inlet connector and a second end communicated with a liquid inlet of the liquid outlet connector; and an atomizer, connected in the connecting pipeline, the atomizer is closer to the liquid outlet connector than the liquid inlet connector.

13. The outdoor sports backpack according to claim 12, wherein the backpack body comprises a bag body and a partition layer, wherein the bag body has the storage cavity, the first pipeline outlet, and the second pipeline outlet; the partition layer is arranged in the storage cavity and connected to the bag body to divide the storage cavity into a first sub-cavity and a second sub-cavity; when the outdoor sports backpack is in a worn state, the first sub-cavity is adjacent to a user's back, and the partition layer has a first through-hole and a second through-hole; and the liquid storage assembly is arranged in the first sub-cavity, and the atomization module is arranged in the second sub-cavity, the second end of the first pipe section is capable of passing through the first through-hole from a side of the first sub-cavity into the second sub-cavity to be communicated with the liquid inlet end of the liquid inlet connector; the second end of the second pipe section is capable of passing through the second through-hole from a side of the second sub-cavity into the first sub-cavity and passing through the first pipeline outlet to partially extend out of the first sub-cavity.

14. The outdoor sports backpack according to claim 12, wherein the atomization module further comprises:

a housing, comprising an installation cavity, a first opening communicated with the installation cavity, and a second opening communicated with the installation cavity;

a battery, arranged in the installation cavity and connected to the housing;

a main control board, arranged in the installation cavity and connected to the housing, wherein the main control board is electrically connected to the battery and the atomizer;

wherein the connecting pipeline is arranged in the installation cavity, the atomizer is arranged in the installation cavity and connected to the housing, the liquid inlet connector corresponds to the first opening and connected to the housing, the liquid outlet connector corresponds to the second opening and connected to the housing; the first opening and the second opening are positioned on a same side of the housing.

15. The outdoor sports backpack according to claim 14, wherein a spray nozzle is arranged at the second end of the second pipe section and is configured to be switched between an open state and a closed state; the spray nozzle comprises a nozzle body and a plurality of nozzle tips, wherein the nozzle body is connected to the second end of the second pipe section and is detachably connected to one of the plurality of nozzle tips, and the plurality of nozzle tips have orifices in different diameters respectively.

16. The outdoor sports backpack according to claim 15, wherein the plurality of nozzle tips comprises a first nozzle tip having an orifice with a diameter of 0.15 millimeters and a second nozzle tip having an orifice with a diameter of 0.2 millimeters.

17. The outdoor sports backpack according to claim 15, further comprising:

a remote control configured to be set to different gears to generate corresponding control signals and to send the control signals to the main control board, a controller integrated on the main control circuit is configured to adjust parameters of the atomizer based on the control signals to change atomizing volume of the spray nozzle.

18. The outdoor sports backpack according to claim 17, wherein the remote control is configured to send the control signals to the main control board wirelessly.

* * * * *